April 1, 1958     J. B. RIDENOUR     2,828,985
PIVOTAL MOUNTING DEVICE
Filed Nov. 18, 1953
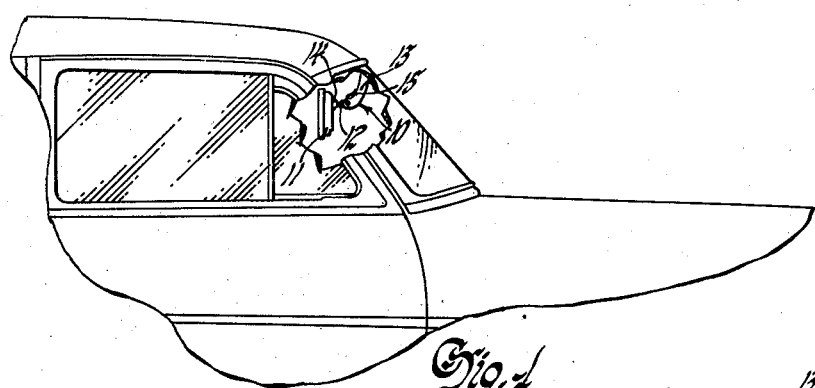
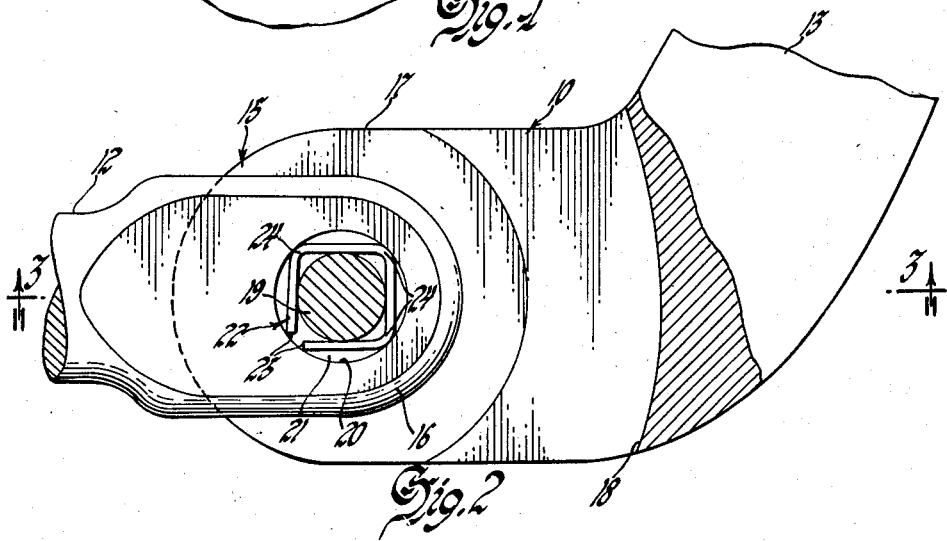
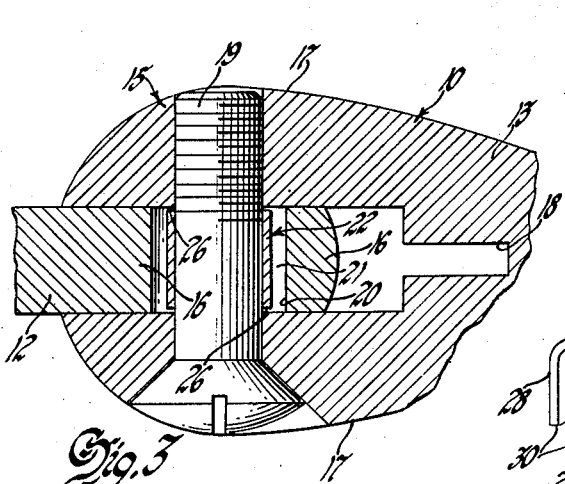
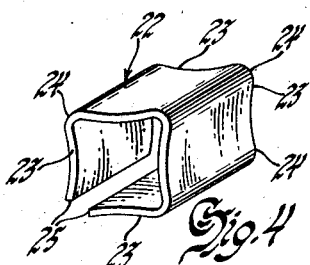
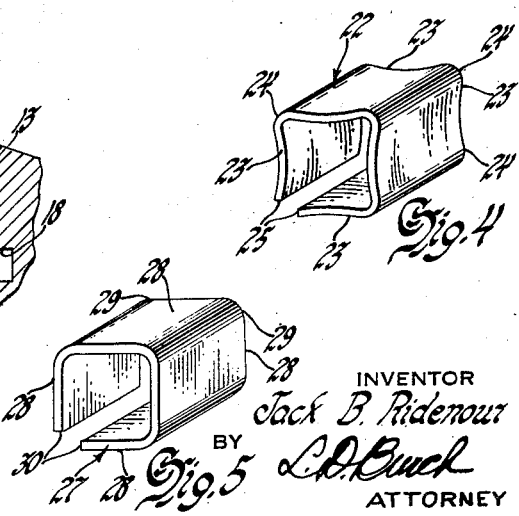
INVENTOR
Jack B. Ridenour
BY
L.O. Buck
ATTORNEY

United States Patent Office

2,828,985
Patented Apr. 1, 1958

2,828,985

PIVOTAL MOUNTING DEVICE

Jack B. Ridenour, Lansing, Mich., assignor to General Motors Corporation, Detroit, Mich., a corporation of Delaware Application November 18, 1953, Serial No. 392,853

1 Claim. (Cl. 287—100)

This invention relates generally to pivoted joints, and more particularly to novel bushing means for clevis type joints adapted for use in rear view mirror assemblies.

It is common practice, in an automobile rear view mirror assembly for example, to provide a clevis type joint therein so that the mirror may be adjusted vertically to suit the needs of the driver. Such a joint usually comprises a member having a pair of spaced arms and a second member having a central arm receivable between the spaced arms. All three arms are provided with passages which, in the assembled condition, may be aligned so that a pivot pin or screw may be passed therethrough to provide a pivotal axis for the joint. In most cases the pivot pin or screw passes through the central arm with clearance. For this reason, the spaced arms must be drawn together for clamping engagement with the central arm in order that frictional engagement between the arms may retain the mirror in any desired position. This is ordinarily accomplished by providing the pivot pin with a head which is retained in a countersunk portion around the passage in one of the spaced arms, while a threaded portion at the other end of the pin engages the threaded passage in the other spaced arm. By turning the screw, the spaced arms may be clamped sufficiently tight against the central arm so that adjustment may be made and retained until it is purposely changed.

It has been found, however, that the axis of the pivot pin is frequently not the pivotal axis of the joint. This is because a secondary pivot usually locates itself at the point of maximum clamping pressure or at the initial contact point between the above arms. Thus, when adjustment is made, the initial pivoting takes place not about the axis of the pin but about the secondary axis, until the clearance between the pivot pin and the pivot passage is taken up and the pin engages the surface of the passage in the central arm. A small amount of such clearance may result in a considerable amount of "angular chuck" or area of loose motion during the initial part of the adjustment, depending in part upon the proximity of the secondary pivot to the axis of the pivot pin. The area of loose motion is limited also by the amount of clearance around the pivot pin, which necessitates close control of passage and pin diameters. In any case, this looseness is quite noticeable and it interferes with proper adjustment of the mirror.

It is now proposed to provide a joint of the type and for the purpose above described in which angular chuck cannot take place. This may be accomplished by providing the central arm with an oversized passage so that there will be more than normal clearance between the pivot pin and the passage. A novel spring bushing may then be inserted into the oversized passage and the pin may be inserted through the bushing so that, in effect, no clearance remains to permit loose motion. In the proposed joint the original amount of clearance between the pin and the passage is not critical since the spring characteristics of the bushing are such that, within sufficiently wide limits of such clearance, the pivot pin will always be yieldingly but firmly centered within the oversized passage.

In the drawings:

Figure 1 is a fragmentary side elevational view of an automobile equipped with a rear view mirror assembly embodying the invention, with portions of the automobile broken away to better show the rear view mirror assembly.

Figure 2 is a fragmentary side elevation view of the rear view mirror assembly shown in Figure 1, with portions thereof being broken away to show the details of internal construction.

Figure 3 is a cross-sectional view taken along the plane of line 3—3 of Figure 2 and looking in the direction of the arrows.

Figure 4 is a perspective view of one form of bushing embodying the invention.

Figure 5 is a perspective view of another form of bushing embodying the invention.

Referring to the drawings in more detail, a rear view mirror assembly 10 embodying the invention comprises a rear view mirror 11, an intermediate link 12, and a bracket 13. The rear view mirror 11 may be secured to the link 12 by a ball and socket joint 14, and the bracket 13 may be secured in any suitable manner to the automobile body. The link 12 is secured to bracket 13 by means of clevis joint 15.

The clevis joint 15 comprises central arm 16 formed on one end of link 12 and receivable between arms 17 formed on one end of bracket 13. By providing slot 18, arms 17 may be adapted to be drawn together to clamp arm 16 therebetween. The lamping is accomplished by means of pivot screw 19 which passes through the oversized pivot passage 20 in arm 16 with more than normal clearance 21.

The clearance 21 is taken up by bushing 22. It will be noted in Figure 4 that bushing 22 may be formed from a strip of spring metal to provide a tubular body having concaved sides 23 separated by portions 24 and adjacent free ends 25. It is desirable that the bushing be shorter than the passage 20 so that end clearance 26 may be provided between the bushing 22 and the arms 17 to prevent binding at those points.

In assembly, the bushing 22 is inserted into the passage 20 and arm 16 is inserted between arms 17 so that screw 19 may be inserted through the bushing 22. Before the screw is inserted, portions 24 and ends 25 of the bushing engage the surfaces of passage 20 and sides 23 remain concaved, thus defining an opening of lesser diameter than the diameter of screw 19. On insertion of screw 19, the sides 23 are necessarily flexed outwardly, as shown in Figure 2. This straightening of sides 23 causes the sides 23 to increase in length so that portions 24 and ends 25 engage the surfaces of passage 20 more firmly, which in turn resists further straightening of sides 23 and assures filrm, though yieldable, contact of sides 23 with screw 19. Variances in clearance 21, such as those likely to be encountered due to machining tolerances, have no adverse effect on this structure since flexure of the sides 23 wil easily compensate for such variances. Screw 19 may be tightened, as usual, to any desired degree to permit and retain adjustment.

The bushing 27 shown by Figure 5 is a modification of the bushing 22 shown by Figure 4. It will be noted that the difference between bushings 22 and 27 is that sides 28 are straight when the bushing 27 is in normal untensioned condition. As in bushing 22, sides 28 define a passage through the bushing 27 which is of lesser diameter than the diameter of pivot screw 19. When bushing 27 is inserted into pivot passage 20, portions 29 and adjacent free ends 30 may lightly engage the surfaces of passage 20. However, when pivot screw 19 is inserted through bushing 27, the sides 28 will be flexed outwardly beyond the straight position, and portions 29 and free ends 30 of bushing 27 will engage the surfaces of passage 20 more firmly and thereby resist further outward flexure of sides 28. Free ends 30 will tend to spread farther apart, rather than come together like free ends 25 do in bushing 22. As in the case of bushing 22, sides 28 will thus yieldingly but firmly center pivot screw 19 within passage 20.

It will be observed from the foregoing description and drawings that there has been provided a pivoted joint in which clearance is first amply provided and then completely removed by means of a novel form of bushing disposed within said clearance so that the joint must pivot about the axis of the pivot screw and substantially about the axis of the pivot passage. Should there arise a tendency to set up a secondary pivot, the spring tension of the bushing will smoothly and unperceptibly overcome such tendency, or its effects, so that no area of loose movement may be present.

What is claimed is:

In combination in a clevis type joint, a first member having an inner cylindrical wall defining a laterally extending oversized pivot aperture, a second member including a pair of laterally spaced arms having axially aligned pivot apertures receiving a pivot shaft therethrough in tightly journalled relationship, said shaft also being received through said oversized pivot aperture intermediate said arms, a bushing disposed axially about said shaft and received within said oversized pivot aperture, and means for biasing said arms against said first member for frictional engagement therewith, said bushing having a longitudinally extending body comprising a unitary strip of spring sheet metal formed to provide a substantially polygonal multi-cornered cross section, said body having a longitudinally extending length at least substantially as great as the minimum width of said polygonal cross section and further having edges defining a longitudinal split at one corner there of, said bushing being admitted freely within said oversized pivot aperture in an unstressed condition and expanded by said bolt to a stressed condition within said aperture, said bushing split edges and said bushing polgonal corners thereby being forced into engagement with said inner wall to resist further expansion and rotation of said bushing body.

References Cited in the file of this patent
UNITED STATES PATENTS

| 1,384,173 | Wikander | July 12, 1921 |
| 1,572,770 | Colley | Feb. 9, 1926 |
| 1,893,245 | Ritz-Woller | Jan. 3, 1933 |
| 2,073,957 | Brouwer | Mar. 16, 1937 |
| 2,106,860 | Tibbetts | Feb. 1, 1938 |
| 2,325,615 | La Hodny | Aug. 3, 1943 |

FOREIGN PATENTS

| 505,716 | Great Britain | May 16, 1939 |